United States Patent [19]

Lopez

[11] Patent Number: 4,848,628
[45] Date of Patent: Jul. 18, 1989

[54] REMOVABLE CAR ACCESSORY CONTAINER

[76] Inventor: Gaudelupe Lopez, 31 Clark St., Pontiac, Mich. 48058

[21] Appl. No.: 182,362

[22] Filed: Apr. 18, 1988

[51] Int. Cl.⁴ .............................................. B60R 9/04
[52] U.S. Cl. .................. 224/309; 224/42.01; 224/324; 224/329; 190/27; 190/903; 410/97; 410/106
[58] Field of Search ............... 224/42.01, 309, 314, 224/318, 320, 328, 329, 330, 331, 42.42, 324; 410/97, 101, 102, 106, 115, 116; 190/903, 27

[56] References Cited

U.S. PATENT DOCUMENTS

| 2,983,413 | 5/1961 | Verwers | 224/318 |
| 3,565,305 | 2/1971 | Belokin, Jr. | 224/328 |
| 3,670,934 | 6/1972 | Kraselesky | 224/328 |
| 3,960,301 | 6/1976 | Miller | 224/318 |
| 4,050,614 | 9/1977 | Simpson | 224/328 |
| 4,108,324 | 8/1978 | Riva | 224/42.01 |
| 4,345,706 | 8/1982 | Benit | 224/327 |
| 4,779,779 | 10/1988 | Haugland | 224/328 |

FOREIGN PATENT DOCUMENTS

| 810807 | 3/1937 | France | 224/329 |
| 1089543 | 3/1955 | France | 224/318 |
| WO84/04074 | 10/1984 | PCT Int'l Appl. | 224/328 |

Primary Examiner—Ernest G. Cusick

[57] ABSTRACT

A removable car accessory container including a container, which is substantially rectangular and has four walls and a top and bottom, a zipper attached to one of the walls, one handle attached to one of the walls, suction cups on the bottom of the container, and tie-downs holding the container to the car.

1 Claim, 1 Drawing Sheet

U.S. Patent
Jul. 18, 1989
4,848,628
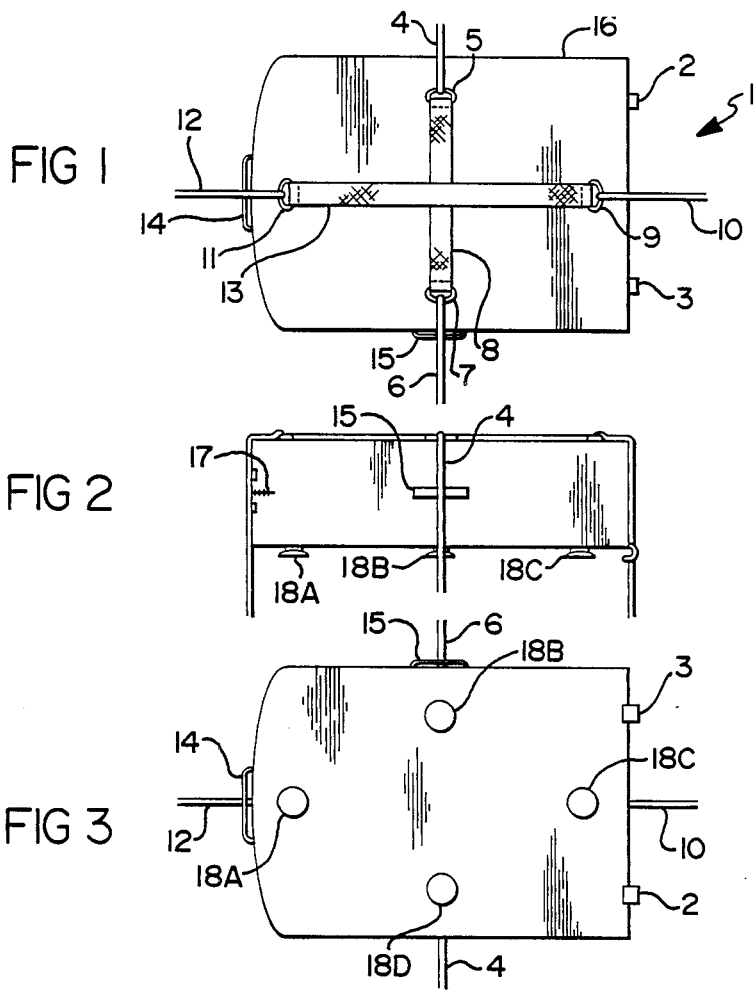
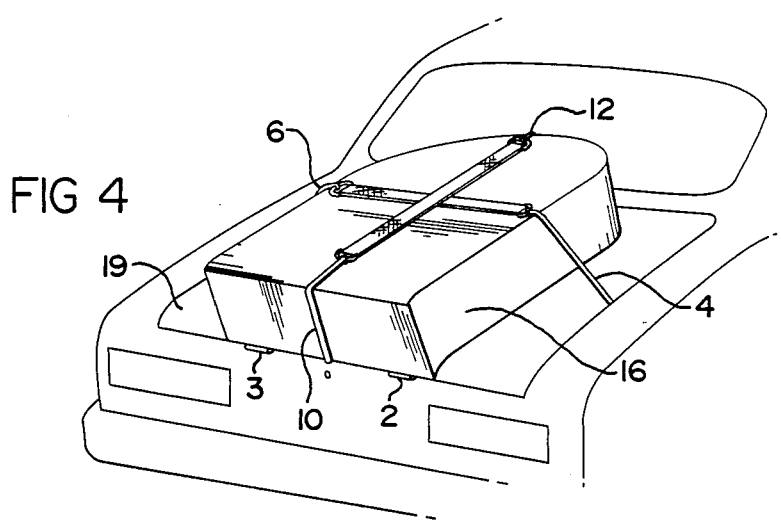

REMOVABLE CAR ACCESSORY CONTAINER

BACKGROUND OF THE INVENTION

1. Field of the Invention

The present application relates to apparatus which is mounted on an automobile exterior for carrying items. Specifically, the present invention is concerned with removable apparatus for carrying items on the exterior of an automobile.

2. Description of Relevant Art

Previously most apparatus for carrying items on the exterior of an automobile have been of a permanent nature, e.g., luggage racks. Especially, when concerned with carrying items on the trunk lid portion of a car. Most removable apparatus have heretofore been mounted on the top portion of the mid section of cars. Often this is accomplished with the use of suction cups. Such apparatus have had the failing of not being readily adaptable to the trunk lid of an automobile as often they are very slanted and do not present the flat level surface necessary for adhesion of the suction cups thereto due to indentations therein.

SUMMARY OF THE INVENTION

Applicant's invention includes a carrying container having thereon grasping hooks and tie-downs which go over said carrying container which are of sufficient length to circumvent the carrying container as well as the bottom and top of the trunk lid of a common automobile. Thus, applicant's invention overcomes the failings of the prior art by having hooks which attach to the edge of the lid of the automobile as well as tie-downs which overcome any configuration of the automobile trunk lid which would not allow other means to adhere thereto. Alternatively, applicant's invention may also include suction cups on the underside of the carrying container to provide further stability and so that the invention may also be used on flat surfaces where the tie-downs have insufficient length to be utilized. The tie-downs may be made from arrangements of straps and cords of flexible material connected to rings.

BRIEF DESCRIPTION OF THE DRAWINGS

FIG. 1 is a top plan view of applicant's apparatus.

FIG. 2 is a vertical cross sectional view of applicant's apparatus.

FIG. 3 is a bottom plan view of applicant's apparatus.

FIG. 4 depicts applicant's apparatus as it may be employed on a conventional automobile trunk lid.

DETAILED DESCRIPTION OF THE PREFERRED EMBODIMENT

As can be seen in FIG. 1 invention 1 includes container 16 which is made of a flexible material and has at one end first hook 2 and second hook 3 for attaching to a trunk lid as depicted in FIG. 4. Container 16 is held down by a first cord 4 operably attached to first half ring 5 which in turn is attached to first strap 8 which in turn is attached to second half ring 7 which in turn is attached to second cord 6. This assembly is referred to generically as a tie-down in the Summary of Invention. A second tie-down which includes third cord 10 is attached to third half ring 9 which is attached to second strap 13 which is attached to forth half ring 11 which is attached to forth cord 12 is in a generally horizontally orthoginal arrangement with respect to first strap 8. It should be noted as well that when container 16 is removed from an automobile that it may be carried by first handle 14 or alternatively by second handle 15.

In FIG. 2 it is shown that access to the interior of container 16 may be gained through the opening of zipper 17. Additionally, the cross sectional view as shown in FIG. 2 of invention 1 depicts it with suction cups on the bottom side of container 16. FIG. 2 further shows how the first, second, third and forth cords respectively 4, 6, 10 and 12 extend below container 16.

FIG. 3 allows a view of the bottom side of container 16 and the four suction cups thereon as indicated by 18a, b, c and d. Furthermore, FIG. 3 shows that first hook 2 and second hook 3 are attached to the bottom side of container 16. Again handles 15 and 14 can be seen as well as cords 10, 6, 12, and 4.

Turning to FIG. 4 it can be seen that the cords 4 and 10 are actually held in place by the closed trunk lid 19. Simarlarly, cords 12 and 6 are held by the closed trunk lid 19, but this is not shown in the drawing. For additional stability the cords 4, 6, 10 and 12 may be connected together underneath the trunk lid, 19. Also, hooks 2 and 3 grasp the edge of the trunk lid. Alternatively, hooks 2 and 3 could be connected to another part of container 16 to grip the trunk lid 19 at a different point.

The invention should not be construed to be limited to the description of the preferred embodiment. Additionally, the invention will be better understood when viewed in light of the appended claims.

I claim:

1. An apparatus for carrying items on a conventional trunk lid of an automobile, comprising, in combination:
   (a) a container;
   (b) said container is substantially rectangular and has four walls and a top and bottom;
   (c) a zipper operably attached to one wall of said container defining an aperture therein;
   (d) at least one handle operably attached to said container;
   (e) first means, for causing the bottom of said container to adhere to the trunk lid, operably attached to said container;
   (f) second means, for exerting a holding down force on the top of said container, operably attached to said container;
   (g) said first means includes a plurality of suction cups arranged in a pre-determined fashion on the bottom of said container;
   (h) said second means includes at least two tie-downs;
   (i) at least two hooks operably attached to the bottom of said container;
   (j) said hooks are of a pre-determined configuration for grasping the trunk lid of an automobile;
   (k) said at least one handle is operably attached to the exterior of one of said walls; and
   (l) each said tie-down includes:
   (m) a strap having first and second ends;
   (n) a first ring operably attached to the first end of said strap;
   (o) a second ring operably attached to the second end of said strap;
   (p) a first cord operably attached to said first ring; and
   (q) a second cord operably attached to said second ring.

* * * * *